United States Patent Office 3,567,452
Patented Mar. 2, 1971

3,567,452
PHOTOGRAPHIC ELEMENT WITH
POLYMERIC FILM BASE
Stokes Smith Rawlins, Jr., Piscataway, N.J., assignor to
E. I. du Pont de Nemours and Company, Wilmington,
Del.
No Drawing. Filed May 7, 1968, Ser. No. 727,333
Int. Cl. G03c 1/78
U.S. Cl. 96—87
2 Claims

ABSTRACT OF THE DISCLOSURE

A film element comprising a dimensionally stable hydrophobic macromolecular organic polymer film base bearing on at least one surface a non-tacky layer of a mixture of a vinylidene chloride/alkyl acrylate/itaconic acid terpolymer and a polymer of ethyl acrylate or methacrylate and a cross-linking di-ethenyl or di-propenyl monomer subsequently formed in the presence of the terpolymer. Aqueous coating dispersions containing the mixture of terpolymer and cross-linked polymer.

Photographic elements having a water-permeable colloid silver halide layer on a support coated first with the non-tacky layer then overcoated with geltain.

BACKGROUND OF THE INVENTION

Field of the invention

This invention pertains to organic polymer coating compositions for anchor layers on hydrophobic organic polymer films and to the coated films, especially photographic base films and to their preparation.

Description of the prior art

In the manufacture of coated films, particularly photographic film base, it is conventional practice to apply to a clear hydrophobic, organic polymer film base a coating of a vinylidene chloride copolymer. The primary function of the copolymer is to provide an anchoring substratum between the hydrophobic film and a water-permeable colloid layer, e.g., a gelatin-containing layer.

There are many addition copolymers which may be used. Alles et al., U.S. Pats. 2,627,088 and 2,698,240, and Swindells, U.S. Pat. 2,698,235, disclose products and processes which embody the use of vinylidene chloride copolymers, and particularly copolymers of vinylidene chloride with acrylic esters and itaconic acid as coatings for films suitable for the application of subsequent photographic coatings particularly colloid silver halide emulsion coatings. The vinylidene chloride copolymer coatings of these patents in some instances supply water-proof qualities to the materials on which they are coated. More important is the fact that they also supply a strong adhesive bond between the film support and subsequently applied coatings or layers.

Assignee's application, Cohen, Ser. No. 440,910, filed Mar. 18, 1965, now Pat. No. 3,460,944 and corresponding French Pat. 1,445,541 uses a mixture of vinylidene chloride/alkyl acrylate/itaconic acid terpolymer and an alkyl acrylate or alkyl methacrylate to give substantially improved anchorage between a hydrophobic polyester film support and subsequent water-permeable colloid layers, including gelatino-silver halide layers. In assignee's, Rawlins application, Ser. No. 494,257, filed Oct. 8, 1965, U.S. Pat. 3,443,950, May 13, 1969, and corresponding British patent specification 1,091,834, there is described means for providing a still greater increase in anchorage, a reduction in repellency spots and masking of scratches by using a polymer mixture obtained by polymerizing an alkyl acrylate in an aqueous dispersion of a vinylidene chloride/alkyl acrylate/itaconic acid terpolymer.

The use of a difunctional compound to serve as a crosslinking agent is taught in assignee's application, Appelbaum, Ser. No. 632,942, filed Apr. 24, 1967, now abandoned. This application discloses a process of manufacturing a copolymer coated polyester film by starting with a biaxially oriented polyester film, conditioning the surface, then coating the surface with an aqueous dispersion of a terpolymer comprising an unsaturated ester such a methyl acrylate, a difunctional compound such as allyl acrylate and itaconic acid.

Assignee's D'Cruz application Ser. No. 547,152, filed May 3, 1966, abandoned Jan. 31, 1969, but first refiled as Ser. No. 791,164, Jan. 14, 1969, discloses a coating composition made up of a tricomponent copolymer of (a) 70 to 90% by wt. of an alkyl ester of an $\alpha,\beta$-unsaturated monocarboxylic acid which may be an alkyl acrylate such as methyl acrylate, (b) 7 to 20% of an aliphatic difunctional monomeric ester such as allyl acrylate, and (c) 3 to 30% of an unsaturated carboxylic acid such as itaconic acid.

If the copolymer coating compositions of the prior art patents and patent applications listed above were used in the continuous process of manufacturing photographic film as described in Alles, U.S. Pat. 2,627,088, or in Alles, U.S. Pat. 2,779,684, the following problem is created. During the continuous processing of a web, it is not uncommon for a web to tear because of various reasons. These reasons might be an imperfection in the cast film, misalignment of equipment or failure to maintain proper operating conditions. This tear is most likely to occur during the stretching of the film and almost always occurs after the film is cast and coated with the copolymer.

Meanwhile, the resin coated web threaded through the system, particularly that section existing after stretching and heat setting does not contain a gel overcoat and may be subjected to a temperature between 50 and 80° C., has a tendency to slack at certain locations and sometimes overlaps itself in such a fashion that two copolymer coated surfaces touch. When this touching occurs, the surfaces stick to each other and an attempt to run this overlapping section of web through the rest of the system causes many operational problems and frequently results in this overlapping section catching onto some part of the system or jamming between two nip rolls causing the web to tear again.

An important advantage of a coated layer of this invention is the non-tacky character of the layer when, after being bilaterally stretched at temperatures approximating 190° C., it is subjected to temperatures above 50° C. This non-tacky character eliminates the problem of a coated web sticking to itself to cause a fold and thereby makes the handling of a polymer layer web much easier. Furthermore, a non-tacky polymer layer web is less likely to pick up surface contaminants. In addition to the quality of being non-tacky, the novel layers of this invention provide excellent anchorage to photographic layers.

SUMMARY OF THE INVENTION

The novel compositions of the invention are made by admixing an aqueous dispersion of:

(a) 90 to 65% by wt. of vinylidene chloride/alkyl acrylate/itaconic acid terpolymer wherein the alkyl group has 1 to 4 carbon atoms and said components are present in the respective amounts by wt. of 50–96%, 3.5–40%, and 0.5–10%, with (b) 4.95 to 29.75% by wt. of an alkyl acrylate or methacrylate where alkyl contains 1–10 carbon atoms and 0.05 to 5.25 by wt. based on the terpolymer of a crosslinking agent from the group consisting of di-ethenyl benzene and di-propenyl aliphatic or aromatic esters and initiating amounts of an addition polymerization initiator and polymerizing any monomers present.

Suitable di-ethenyl and di-propenyl monomers include divinyl benzene and diallyl esters of dibasic carboxylic acids, e.g., diallyl maleate, diallyl sebacate and diallyl phthalate.

Alternate embodiments include the addition of the crosslinking agent to part (a) above and/or the addition of itaconic acid to (b) above.

The resulting aqueous dispersions are then coated onto a suitable dimensionally-stable, hydrophobic polymer film base and dried. The base may be unoriented or biaxially oriented at the time the coating is applied.

DESCRIPTION OF THE PREFERRED EMBODIMENTS

In a preferred embodiment of this invention 90 to 75% by wt. of an aqueous dispersion of a vinylidene chloride/ methyl acrylate/itaconic acid terpolymer containing the respective amounts by wt. of 96–50%, 3.5–40% and 0.5–10% are mixed with from 9.8–22.5% by wt. of ethyl acrylate and 0.20–2.5% by wt. of diallyl maleate and an addition polymerization initiator. A convenient method of preparing such a composition is to form the dispersion of the terpolymer and polymerize in it by heating to within the range of 30° C. to 70° C. the desired proportion of ethyl acrylate and diallyl maleate. The mixture may then be coated on a polyethylene terephthalate film base, dried, and the coated film base biaxially stretched in the manner described in Alles, U.S. Pat. 2,779,684. The coated films may be used as the base for various products, e.g., drafting film as described in Van Stappen, U.S. Pat. 2,964,423, or a support for a photographic silver halide emulsion. The drafting layers listed in said patent and in British specification 1,091,834 can be applied to the polymer layer of this invention.

The addition polymerization initiator system may be an aqueous dispersion containing a redox system. Well known redox systems are ferrous iron in the presence of ammonium persulfate or sodium pyrophosphate. A preferred system is ammonium persulfate and sodium metabisulfite as described in Swindell, U.S. Pat. 2,698,235. The total redox concentration in general should be within a range of about 0.01% to about 2.0%, and preferably 0.1% to 1.0%, by weight of the monomer charge. A redox is preferred because polymerization can be carried out at low temperatures and in short periods of time.

In this invention, two polymerization steps are needed. A redox system as described above may be used for both steps. However, two different polymerization initiator systems may be used. The first step is the polymerization of the terpolymer vinylidene chloride, methyl acrylate, and itaconic acid, which is carried out at a low temperature, e.g., about 35° C., and a redox system makes it practical. The second step of polymerizing ethyl acrylate and diallyl maleate in the terpolymer of vinylidene chloride, methyl acrylate, and itaconic acid can be carried out at temperatures up to 70° C. and is not limited to a redox system. Useful initiators for this second stage of polymerization are organic peroxides, e.g., benzoyl peroxide, persulfates, e.g., sodium persulfate, and perborates, e.g., sodium perborate and other catalysts described in Illingsworth 2,763,625.

Generally, the compositions of this invention are made up of (a) a terpolymer, and (b) a homopolymer of an alkyl acrylate crosslinked with diallyl maleate.

The term sequentially polymerized when used in this patent is meant to define the following process. First, a primary composition is made which is an aqueous dispersion of a multipolymer system. Secondly, a monomer is mixed with a crosslinking agent forming a secondary composition and this secondary composition is added to the primary composition and polymerized in the primary composition to yield a mixed polymer composition.

The terpolymer is made up of vinylidene chloride, an alkyl acrylate and itaconic. The alkyl group may contain 1 to 4 carbon atoms. Usable terpolymers are disclosed in Swindell, U.S. Pat. 2,698,235 and Alles et al., U.S. Pat. 2,698,240.

The homopolymer may be an acrylate ester selected from the group consisting of alkyl acrylates wherein the alkyl group contains 1 to 10 carbon atoms or alkyl methacrylates wherein the alkyl group contains 1 to 10 carbon atoms. Suitable homopolymers are derived from 2-ethylhexyl acrylate, methyl acrylate, n-decyl acrylate and butyl acrylate and the corresponding methacrylates. Of these, ethyl acrylate is preferred.

Diallyl maleate is preferably added to the acrylate monomer and this mixture polymerized in the terpolymer. The amount of diallyl maleate added may vary from 1 to 15% of the ethyl acrylate but the most effective range is from 2 to 10%. Alternatively, diallyl maleate may be reacted in the primary polymerization of the terpolymers to form a crosslinked terpolymer followed by the addition of an acrylate containing diallyl maleate which is polymerized in the primary dispersion.

In an additional embodiment itaconic acid, which must be present in the terpolymer, may also be added to the secondary reaction along with the acrylate and diallyl maleate.

A preferred method of applying the coating compositions of this invention is from an aqueous dispersion. Any normal coating technique or equipment may be used to coat the composition of this invention such as skim coating, extrusion coating, or roll coating.

The invention will now be illustrated but is not intended to be limited by the following procedure and examples wherein the parts and percentages stated are by weight unless otherwise indicated.

PROCEDURE A

Polymerization inhibitors are removed from vinylidene chloride and methyl acrylate in the customary manner (although grades of both these monomers are available with low inhibitor level and can be used without extraction) and the monomers were then mixed in amounts of 90 parts vinylidene chloride, 10 parts of methyl acrylate and 2 parts itaconic acid with:

| | Parts |
|---|---|
| Water | 157 |
| Ammonium persulfate | 0.366 |
| Sodium metabisulfite | 0.176 |
| Sodium salt of lauryl alcohol sulfate (30% aqueous) | 6.6 |

(The sodium lauryl sulfate is a mixture of sodium alkanol sulfates containing 10–16 carbon atoms and predominates in sodium dodecyl sulfate.) The mixture is stirred in a vessel provided with a reflux condenser and the temperature maintained at about 32° to 45° C. until all of the vinylidene chloride has reacted as indicated by cessation of reflux. At this point the temperature is raised to 40° C. for about 15 minutes and then rapidly cooled to 30° C., and stirred for an additional 5 minutes. The resulting dispersion will have a total solids content of 37 to 41% by weight.

Polymerization inhibitor is removed from ethyl acrylate in the customary manner and the di-inhibited monomer is used to prepare the sequentially polymerized final product as follows:

In a suitable vessel 4.5 parts of 30% aqueous solution of the sodium salt of lauryl alcohol sulfate and about 31 parts of distilled water are mixed with the aqueous dispersion obtained in accordance with the process described above of this procedure. To this solution there is added 3.24 parts of the di-inhibited ethyl acrylate, 0.36 part of diallyl maleate and a solution of 0.14 part of ammonium persulfate in 1.4 parts of water, which is followed by the addition of 0.11 part of sodium metabisulfite in 1.2 parts of water. The temperature is raised to 45–55° C. and held at 50–60° C. temperature for 10 minutes. An additional 32.4 parts of ethyl acrylate and 3.6 parts of diallyl maleate is added at the rate of 1.2 parts per minute while the temperature is maintained between 30° and 70° C. The course of the reaction may be followed by adding 50 ml. of saturated potassium chloride solution to a 50 ml. sample of the suspension taken about 15 minutes after the start of feed. The addition of the KCl solution causes precipitation of the polymer as a mass of curds. If the reaction is not proceeding properly, no precipitate will be formed. Addition continues until all ethyl acrylate diallyl maleate has been added. As soon as all of the ethyl acrylate and diallyl maleate mixture has been added, the temperature is maintained between 30° and 55° C. for one-half hour. The dispersion of sequentially polymerized material typically will have a solids content of 40 to 50%, and has a polymer ratio of about 75% by weight of the vinylidene chloride/methyl acrylate/itaconic acid terpolymer to about 25% by weight of polymerized ethyl acrylate/diallyl maleate mixture.

EXAMPLE I

The dispersion of sequentially polymerized material described in Procedure A of this invention was diluted with water to a concentration of 25% solids. The dispersion was placed in the solution receptacle which is located just below the roller in a bead roll coater. The dispersion was then coated, using the bead roll technique, onto both sides of a polyethylene terephthalate film which was cast at a thickness of about 0.075 inch after the manner described in Example IV of Alles, U.S. Pat. 2,779,684. The dispersion was kept at a temperature of 95° F. during coating. The web speed was about 20–35 feet per minute. Examination under these operating conditions indicated excellent coating uniformity.

A control coating dispersion was made consisting of a mixture of the vinylidene chloride/methyl acrylate/itaconic acid copolymer and an ethylacrylate polymer prepared as described in Procedure A of assignee's copending application Rawlins, Ser. No. 494,257, filed Oct. 8, 1965. The control dispersion was diluted with water to 25% solids, and bead roll coated in a manner identical to the technique described above onto webs of polyethylene terephthalate film identical to the film described above.

The film base containing the crosslinked polyethyl acrylate coating and the film containing the control coating were biaxially stretched at about 95° C., first longitudinally and then laterally, about 3 times in unit length and width to provide a final thickness of about .007 inch with a copolymer mixture coating weight of about 5 to 10 mg. per square decimeter on each side. The films were then heat-set at about 188° C. while under low tension. The control coating indicated above shows pronounced sticking tendencies while the cross-linked polymer coating does not stick under these manufacturing conditions. This sticking (blocking) tendency can be demonstrated by placing two polymer only coated samples (2″ square) which have been previously heat-set to 185° C. in polymer to polymer contact under moderate pressure in a laboratory oven held at 60° C. for 5 minutes. After removal and attempting to pull apart the polymer layers, the control film sticks firmly, often delaminating the base when separating, while the cross-linked polymer separates with only slight resistance and no harm to the base.

The films were next coated on both sides with a layer of a gelatin substratum composition having a coating weight of 0.5 mg./dm.². After coating, the films were allowed to shrink under low tension at about 130–135° C.

On one gelatin surface there was coated a gelatin, nonhalation dye-containing layer and on the other side a gelatino-silver halide photographic emulsion of the lithographic type comprising 30 mole percent AgBr and 70 mole percent AgCl at a coating weight of 50.6 mg./dm.² of silver and 55 mg./dm.² of gelatin.

Samples of both films were given a 20-second, intensity scale, sensitometric, step wedge exposure to a white light from a tungsten filament lamp. The exposure in each successive step increased by the fourth root of two. The exposed samples were developed for 2¼ minutes in the following lithographic developer:

Water: 500 ml.
$Na_2SO_3$ anhydrous: 30 g.
Paraformaldehyde: 7.5 g.
$NaHSO_3$: 2.2 g.
Boric acid: 7.5 g.
Hydroquinone: 22.5 g.
Potassium bromide: 1.6 g.
Water to make 1 liter After fixing, washing, and drying in the conventional manner, the sensitometric properties of both films were found to be identical within the limits of experimental error. Both films were found to have satisfactory wet anchorage when tested by exposing samples to white light, processing as above, and, after washing, but before drying, scribing two lines 2 inches long and ½ inch apart through the emulsion layer with a phonograph needle and rubbing across the marks with a rubber squeegee. None of the coatings showed any tendency to peel from the base. The test for dry anchorage was made by scoring the exposed, processed and dried samples with a phonograph needle to produce four parallel scratches through the emulsion layer ¼ inch apart. A series of lines were then scored across these lines at an angle of about 60° to them and about ¼ inch apart to produce 3 lines of 9-rhomboid figures scratched through the emulsion layer. A piece of cellophane, pressure-sensitive, adhesive tape is then pressed down over the scored area and a loose end of the tape grasped at about 90° angle to the film surface. The tape is pulled up briskly and an arbitrary measure of adhesion obtained. An arbitrary scale ranging from a value of 0 for excellent anchorage to 10 for very poor anchorage was used. Tested in this manner, the two films were excellent.

EXAMPLE II

A series of films were prepared. One group was used as a control and did not contain diallyl maleate. The second group of films containing diallyl maleate was prepared in a similar manner to those of Example I.

In this series of samples, the composition proportions were varied to demonstrate the broad effectiveness of the resin compositions of this invention in providing nontacky coatings.

Following are the polymer ratios of the terpolymer sequentially polymerized with ethyl acrylate as used in the control group of samples:

| Vinylidene chloride/methyl acrylate/itaconic acid, parts | Ethyl acrylate parts |
|---|---|
| 95 | 5 |
| 90 | 10 |
| 85 | 15 |
| 80 | 20 |
| 75 | 25 |
| 70 | 30 |
| 65 | 35 |

Following are the polymer ratios of the terpolymer sequentially polymerized with ethyl acrylate crosslinked diallyl maleate where the ethyl acrylate to diallyl maleate is present in the ratio of 9 to 1 parts by weight.

| Vinylidene chloride/methyl acrylate/itaconic acid, parts | Ethyl acrylate/ diallyl maleate, parts |
|---|---|
| 95 | 5 |
| 90 | 10 |
| 85 | 15 |
| 80 | 20 |
| 75 | 25 |
| 70 | 30 |
| 65 | 35 |

The dispersions were coated at final coating weights of both 5–10 mg./dm.$^2$ and 2.4–4.0 mg./dm.$^2$. Those films having a coating containing ethyl acrylate/diallyl maleate exhibited less polymer to polymer tackiness than those without diallyl maleate when tested by placing two like samples in a 180° C. oven for one minute, then cooling to room temperature, then placing the polymer surfaces in contact and holding them together for five minutes at 60° C. On separating, the crosslinked systems show decidedly less sticking.

When tested as described in Example I all of the films displayed essentially the same excellent photographic properties of adherence after photographic processing.

EXAMPLE III

Four sequentially poymerized dispersions cross-linked with diallyl maleate were made as described in Procedure A, except that the substitutions indicated below were made for ethyl acrylate in the second and third paragraphs of Procedure A. The materials were substituted for ethyl acrylate on a weight for weight basis.

| Sequentially polymerized dispersion | Substitute for ethyl acrylate |
|---|---|
| 1 | Methyl acrylate. |
| 2 | Butyl acrylate. |
| 3 | 2-ethylhexyl acrylate. |
| 4 | n-Decyl acrylate. |

The dispersions were diluted to a concentration of 25% solids, and then each was coated on both surfaces of a polyethylene terephthalate film that was cast at a thickness of about 0.075 inch as described in Example IV of Alles, U.S. Pat. 2,779,684. All these subcoatings exhibited excellent coating quality and uniformity. The four coated films were compared with control films containing no diallyl maleate and found to be much less tacky than the control films.

The films were than biaxially stretched, and heat set as described in Example I hereof. Both surfaces of each film were coated with a thin anchoring substratum layer of gelatin (0.5 mg./dm.$^2$). After coating, each film was allowed to shrink under low tension at about 130–135° C. On one gelatin surface there was coated a gelatin, antihalation dye-containing layer and on the other side a gelatino-silver halide photographic emulsion of the lithographic type as described in Example I. The four films were tested in comparison with control film having no diallyl maleate and the same photographic emulsion.

Samples of all of the films were exposed as described in Example I and were developed for 2¼ minutes in the developer of Example I. After fixing, washing, and drying the sensitometric properties of all of the films were found to be substantially identical and all had good wet and dry anchorage.

EXAMPLE IV

Polymerization inhibitors were removed from vinylidene chloride and methyl acrylate in the usual manner and the monomers were mixed in the amounts of 85 parts vinylidene chloride, 15 parts methyl acrylate, 2 parts itaconic acid, and 2 parts diallyl maleate with:

| | Parts |
|---|---|
| Water | 100 |
| Ammonium persulfate | 0.366 |
| Sodium metabisulfite | 0.176 |
| Sodium salt of lauryl alcohol sulfate (30% aqueous) | 6.6 |

React as per Procedure A. The resulting dispersion will have a total solids content of 48–52%.

Ethyl acrylate (15 p.p.m. methoxyhydroquinone initiator) is used without removing the inhibitor to prepare the sequentially polymerized final product as follows:

In a suitable vessel 4.5 parts of a 30% aqueous solution) sodium lauryl sulfate, 0.7% part itaconic acid and about 31 parts of distilled water are mixed with the dispersion from the first paragraph of the example. Additional catalysts in amounts of 0.14 part ammonium persulfate dissolved in 1.4 parts water and 0.11 part sodium metabisulfate dissolved in 12 parts of water may be added, although these are not essential as reactivity will occur without them.

The temperature is raised to 50–55° C. and to the vessel over a 30-minute period is added 22 parts ethyl acrylate and 2 parts diallyl maleate.

The reaction temperature is maintained between 30° and 70° C. When all ethyl acrylate-diallyl maleate has been reacted, the temperature is held an additional 30 minutes at 50–65° C.; then cooled to 30° C., and filtered into a suitable storage container. The resulting dispersion will have a solid content of 46–50% by weight, and has a polymer ratio of about 80% vinylidene chloride/methyl acrylate/diallyl maleate/itaconic acid to about 20% by weight of the ethyl acrylate/diallyl maleate/itaconic acid polymer. When this dispersion is coated on polyester film base and stretched as described in Example I it was tested for its tacky tendency by heating two film samples in a 180° C. oven for 1 min., cooling to room temperature, placing the polymer surfaces in contact and holding them together for 5 min. at 60° C. On separating, the crosslinked systems show decidedly less sticking.

EXAMPLE V

A polymer composition was prepared according to Example IV except that the diallyl maleate was not incorporated with the terpolymer. This results in a composition of vinylidene chloride/methyl acrylate/itaconic acid sequentially polymerized with a tri-component composition of ethyl acrylate/diallyl maleate/itaconic acid. This dispersion was coated on polyester film base and stretched as described in Example I. When tested for tackiness by heating two film samples in a 180° C. oven for 1 min., cooling to room temperature, placing the polymer surfaces in contact and holding them together for 5 min. at 60° C. On separating, the crosslinked systems show decidedly less sticking.

When tested as described in Example I, these films displayed excellent photographic properties.

EXAMPLE VI

A polymer composition was prepared according to Example IV except that the itaconic acid was omitted from the sequentially crosslinked ethyl acrylate. This results in a basic composition of vinylidene chloride/methyl acrylate/itaconic acid/diallyl maleate sequentially polymerized with ethyl acrylate/diallyl maleate. This dispersion was coated onto a polyester film base and stretched as described in Example I. When tested for tackiness by heating two film samples in a 180° C. oven for 1 min., cooling to room temperature, placing the polymer surfaces in contact and holding them together for 5 min. at 60° C. On separating, the crosslinked systems show decidedly less sticking.

EXAMPLE VII

Three separate polymer compositions were prepared according to Procedure A. In each composition the diallyl maleate was substituted by the following compounds, respectively:

(1) Diallyl phthalate
(2) Divinylbenzene
(3) Diallyl sebacate

Three samples were prepared by bead roll coating these compositions onto both sides of a polyethylene terephthalate film which was cast at a thickness of 0.075 inch after the manner described in Example IV of Alles, U.S. Pat. 2,779,684. The films were biaxially stretched and heat-set at about 180° C. After cooling the three samples were tested for polymer to polymer tackiness by first heating each sample at 60° C. for 5 minutes, then taking each sample separately and placing it in polymer to polymer contact with itself. When separated the samples having a composition containing diallyl phthalate and divinyl benzene parted very easily with no transfer of materials while the sample using diallyl sebacate in the polymer coating composition separated with a little drag showing a slight tendency to stick but no material was transferred.

Each sample was then coated with a thin layer of gelatin and a lithographic type gelatino-silver halide photographic emulsion as described in Example I. All three films exhibited excellent photographic properties when tested according to Example I.

The film support for the polymer compositions in the novel processes of this invention may be any suitable transparent plastic. For example, the cellulosic supports, e.g., cellulose acetate, cellulose triacetate, cellulose acetate butyrate, etc., may be used. Polymerized vinyl compounds, e.g., copolymerized vinyl acetate and vinyl chloride, polystyrene, and polymerized acrylates may also be mentioned. The film formed from the polyesterification product of a dicarboxylic acid and a dihydric alcohol made according to the teachings of Alles, U.S. Pat. 2,779,684 and the patents referred to in the specification of that patent are eminently satisfactory. Other suitable supports are the polyethylene terephthalate/isophthalates of British Patent 766,290 and Canadian Patent 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al. 3,052,543, Sept. 4, 1962, may be used. The above polyester films are particularly suitable because of their dimensional stability.

In addition, the sequentially polymerized subbing compositions of the invention may be applied to paper and cloth.

The subbing compositions of the present invention are ideally suited for the reception of gelatin coatings, e.g., gelatin subbing treatments, nonhalation layers and photographic emulsions.

In place of part or all of the gelatin other natural or synthetic water-permeable organic colloid binding agents can be used in the intermediate or photographic emulsion layers coated on the substratum layers of the present invention. Such agents include water-permeable or water-soluble polyvinyl alcohol and its derivatives, e.g., partially hydrolyzed polyvinyl acetates, polyvinyl ether, and acetals containing a large number of extra-linear

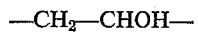

groups: hydrolyzed interpolymers of vinyl acetate and unsaturated addition polymerizable compounds such as maleic anhydride, acrylic and methacrylic acid ethyl esters, and styrene. Suitable mixed colloid emulsions are described in Assignee's Nottorf, 3,325,286, June 13, 1967 and Aug. 28, 1961, respectively, and Cohen and Shacklett, 3,252,801, May 24, 1966 and 3,203,804, Aug. 31, 1965, respectively. The useful polyvinyl acetals include polyvinyl acetaldehyde acetal, polyvinyl butyraldehyde acetal and polyvinyl sodium o-sulfobenzaldehyde acetal. Other useful colloid binding agents include the poly-N-vinyllactams of Bolton, U.S. Pat. 2,495,918, the hydrophilic copolymers of N-acrylamido alkyl betaines described in Shacklett, 2,833,650, May 6, 1958, and hydrophilic cellulose ethers and esters.

In addition to serving as substratum anchoring layers for photographic coatings, the coatings of the present invention also provide strongly adherent, flexible substrata for drafting film coatings, e.g., the urea-formaldehyde and melamine formaldehyde coatings of Van Stappen, U.S. Pat. 2,964,423, Dec. 13, 1960, and the matted acrylic coatings of Moede, 3,353,958, Nov. 21, 1967.

The subbing compositions and/or subsequent coatings can be applied to the web supports or films by any method known to the art, e.g., dip or skim coating, or coating with rollers. Suitable coating methods are shown in Heilman, U.S. Pat. 3,025,828, Wamsley, U.S. Pat. 3,038,441, Brandsma et al., U.S. Pat. 3,063,868, and Haley, U.S. Pat. 3,082,144. Various coating aids and surfactants may be added in the manner known to the art, but must be compatible with the surfactants, if any, already present and not deleterious to subsequently applied coatings, e.g., photographic emulsions.

The subbing compositions may contain various pigments and dyes for various purposes, e.g., carbon black, barium sulfate, titanium dioxide, zinc oxide, magnesium oxide, silicon dioxide, phthalocyanines and other organic and inorganic pigments can be used as well as various dyes, e.g., among the dyes useful in the invention are Fuchsine (C.I. 42510), Auramine Base (C.I. 41000B), Calcocid Green S (C.I. 44090), Para Magenta (C.I. 42500), Tryparosan (C.I. 42505), New Magenta (C.I. 42520), Acid Violet RRL (C.I. 42425), Red Violet 5RS (C.I. 42690), Nile Blue 2B (C.I. 51185), New Methylene Blue GG (C.I. 51195), C.I. Basic Blue 20 (C.I. 42585), Iodine Green (C.I. 42556), Night Green B (C.I. 42115), C.I. Direct Yellow 9 (C.I. 19540), C.I. Acid Yellow 17 (C.I. 18965), C.I. Acid Yellow 29 (C.I. 18900), Tartrazine (C.I. 19140), Supramine Yellow G (C.I. 19300), Buffalo Black 10B (C.I. 27790), Naphthalene Black 12R (C.I. 20350), Fast Black L (C.I. 51215), and Ethyl Violet (C.I. 20350), and Ethyl Violet (C.I. 42600).

It is an advantage of the present invention that it permits the formation of water-proof coatings for photographic papers, film base or drafting films. A further advantage is that the invention supplies coatings which are firmly adherent in both the wet and dry states to a wide variety of natural and synthetic polymers. A still further advantage is the fact that the coatings of the present invention may be altered readily to provide films suited to a variety of different uses. A still further advantage is the fact that the polymers used in the coatings are readily and economically prepared by conventional processes. The sequentially polymerized dispersions used to obtain the substrata of this invention exhibit superior coating quality as compared to the prior art dispersions used to obtain mixed homopolymer/vinylidene chloride copolymer substrata, while retaining equivalent resistance to organic solvents used in staging lacquers, and slightly improving adherence to polyester film bases and water-permeable colloid layers, which is an important advantage. And above all the films of this invention are nontacky allowing for greater convenience in handling the web during manufacturing.

The embodiments of the invention in which an exclusive property or privilege is claimed are defined as follows:

1. A photographic film element comprising a dimensionally-stable, hydrophobic macro-molecular organic polymer film base bearing on at least one surface a layer comprising a mixture sequentially polymerized of
   (a) 95% to 65% by weight of vinylidine chloride/alkyl acrylate/itaconic acid terpolymer wherein the alkyl group has 1 to 4 carbon atoms and said components are present in the respective amounts by wt. of 50–96%, 3.5–40%, and 0.5–10%, and (b) 4.95 to 29.75% by wt. of an alkyl acrylate or methacrylate polymer where alkyl contains 1–10 carbon atoms crosslinked with 0.05 to 5.25% by wt. of a crosslinking agent selected from the group consisting of di-ethenyl benzene and di-propenyl aliphatic or aromatic esters and initiating amounts of an addition polymerization initiator, the crosslinked copolymer of this step being formed by addition polymerization and crosslinking in the presence of the copolymer defined under (a), the percentages being based on the total weight of the crosslinked polymer, (c) and having on said layer a light-sensitive silver halide layer.

2. An element according to claim 1 wherein the silver halide layer is a gelatino-silver halide emulsion layer.

References Cited
UNITED STATES PATENTS 3,117,950    1/1964    Kibler et al.    96—87
3,112,199   11/1963    Camerini et al.   96—87

NORMAN G. TORCHIN, Primary Examiner

E. C. KIMLIN, Assistant Examiner

U.S. Cl. X.R.

260—885